(12) United States Patent
Hsieh et al.

(10) Patent No.: US 12,595,176 B2
(45) Date of Patent: Apr. 7, 2026

(54) PREPARATION METHOD OF LITHIUM IRON PHOSPHATE CATHODE MATERIAL

(71) Applicant: Advanced Lithium Electrochemistry Co., Ltd., Taoyuan City (TW)

(72) Inventors: Han-Wei Hsieh, Taoyuan City (TW); Yuan-Kai Lin, Taoyuan City (TW)

(73) Assignee: Advanced Lithium Electrochemistry Co., Ltd., Taoyuan City (TW)

( * ) Notice: Subject to any disclaimer, the term of this patent is extended or adjusted under 35 U.S.C. 154(b) by 589 days.

(21) Appl. No.: 18/196,076

(22) Filed: May 11, 2023

(65) Prior Publication Data

US 2024/0101425 A1 Mar. 28, 2024

(30) Foreign Application Priority Data

Sep. 27, 2022 (TW) .................................. 111136550

(51) Int. Cl.
C01B 25/45 (2006.01)
H01M 4/04 (2006.01)

(52) U.S. Cl.
CPC ........... C01B 25/45 (2013.01); H01M 4/0471 (2013.01); *C01P 2004/61* (2013.01); *C01P 2006/40* (2013.01); *H01M 4/04* (2013.01)

(58) Field of Classification Search
CPC ............................................... H01M 4/00–98
USPC ......................................................... 429/221
See application file for complete search history.

(56) References Cited

U.S. PATENT DOCUMENTS

| | | | | |
|---|---|---|---|---|
| 2011/0037030 A1* | 2/2011 | Holzapfel | ............ | C01G 23/005 977/773 |
| 2012/0058039 A1* | 3/2012 | Huang | ................... | B82Y 30/00 977/948 |
| 2013/0040198 A1* | 2/2013 | Patoux | ................. | C01G 49/009 241/3 |
| 2015/0030517 A1* | 1/2015 | Yu | ........................ | H01M 4/5825 423/306 |

FOREIGN PATENT DOCUMENTS

| | | |
|---|---|---|
| CN | 103208614 A | 7/2013 |
| CN | 103765641 A | 4/2014 |
| CN | 105293458 A | 2/2016 |
| CN | 113113583 A | 7/2021 |

(Continued)

*Primary Examiner* — Bach T Dinh
(74) *Attorney, Agent, or Firm* — KIRTON McCONKIE; Evan R. Witt

(57) ABSTRACT

A preparation method of a lithium iron phosphate cathode material includes steps of (a) providing a phosphoric acid, an iron powder, a carbon source, wherein the phosphoric acid and the iron powder are reacted to produce a first product, and the first product is amorphous iron phosphate with chemical formula of a-FePO$_4$·xH$_2$O (x>0); (b) providing a lithium salt mixture, wherein the lithium salt mixture includes a lithium hydroxide and a lithium carbonate; (c) grinding and mixing the first product, the carbon source, and the lithium salt mixture; (d) calcining the first product and the lithium salt mixture to produce a precursor, wherein the precursor has a formula of Fe$_3$(PO$_4$)$_2$·8H$_2$O+Li$_3$PO$_4$; and (e) calcining the precursor and the carbon source to obtain the lithium iron phosphate cathode material.

19 Claims, 6 Drawing Sheets providing a phosphoric acid, an iron powder and a carbon source, wherein the phosphoric acid and the iron powder are reacted to produce a first product, and the first product is amorphous iron phosphate with chemical formula of a-FePO$_4$ · xH$_2$O (x>0) — S100 providing a lithium salt mixture, wherein the lithium salt mixture comprises a lithium hydroxide and a lithium carbonate — S200 grinding and mixing the first product, the carbon source, and the lithium salt mixture — S300 calcining the first product and the lithium salt mixture to produce a precursor, wherein the precursor has a formula of Fe$_3$(PO$_4$)$_2$ · 8H$_2$O+Li$_3$PO$_4$ — S400 calcining the precursor and the carbon source to obtain the lithium iron phosphate cathode material — S500

(56)                      References Cited

FOREIGN PATENT DOCUMENTS

| | | | |
|---|---|---|---|
| CN | 114864896 | A | 8/2022 |
| EP | 2736101 | A1 | 5/2014 |
| JP | 2014524123 | A | 9/2014 |
| KR | 1020170136779 | A | 12/2017 |
| TW | 201737537 | A | 10/2017 |

* cited by examiner

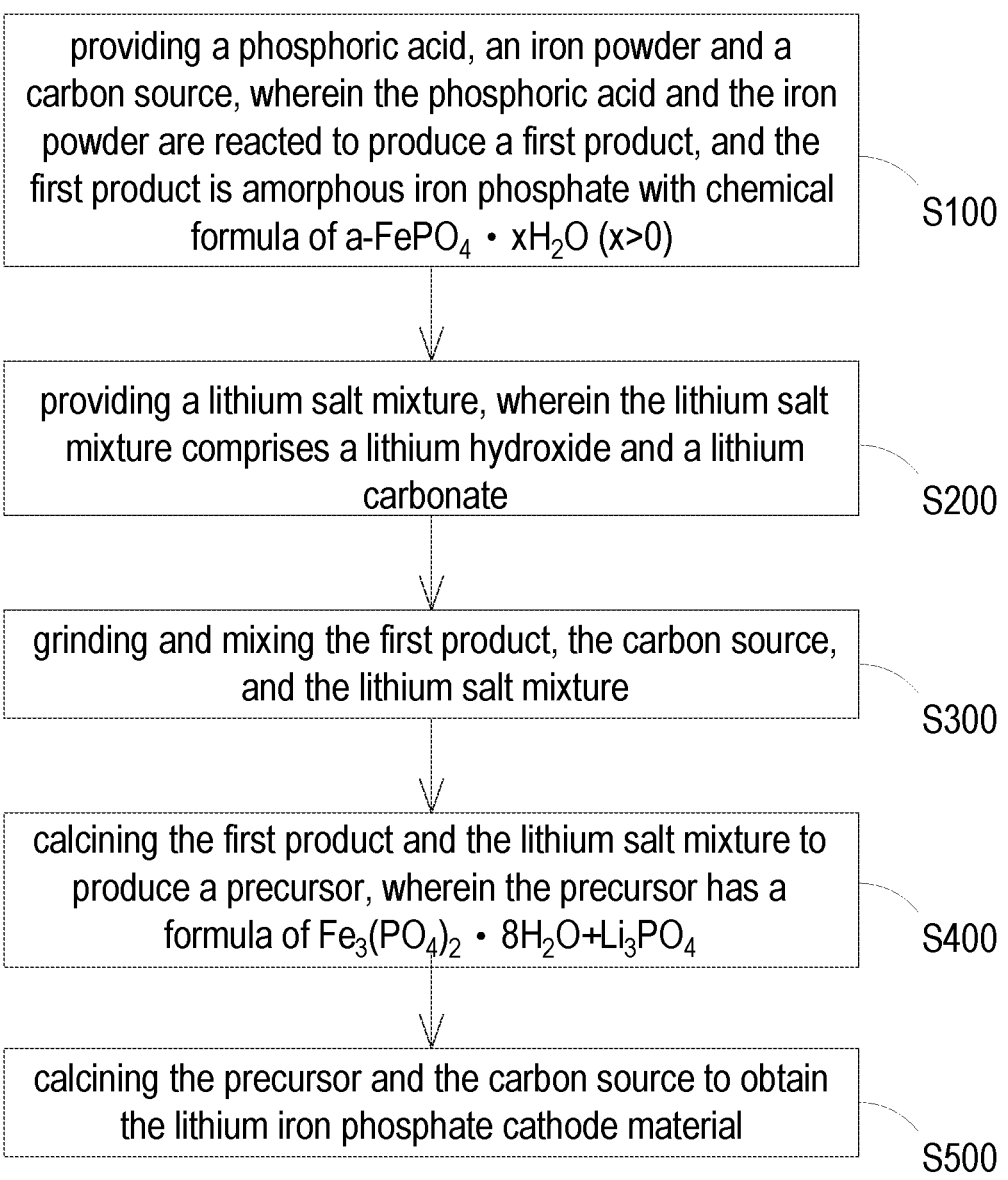

providing a phosphoric acid, an iron powder and a carbon source, wherein the phosphoric acid and the iron powder are reacted to produce a first product, and the first product is amorphous iron phosphate with chemical formula of a-FePO$_4$ • xH$_2$O (x>0)

S100 providing a lithium salt mixture, wherein the lithium salt mixture comprises a lithium hydroxide and a lithium carbonate

S200 grinding and mixing the first product, the carbon source, and the lithium salt mixture

S300 calcining the first product and the lithium salt mixture to produce a precursor, wherein the precursor has a formula of Fe$_3$(PO$_4$)$_2$ • 8H$_2$O+Li$_3$PO$_4$

S400 calcining the precursor and the carbon source to obtain the lithium iron phosphate cathode material

S500

FIG. 1 allowing deionized water to dissolve a first quantity of the phosphoric acid for forming a first phosphoric acid solution at a first temperature

S101 processing a reaction of the first phosphoric acid solution and the iron powder at a second temperature, lowering the reaction temperature to a third temperature after the second temperature is reached by the reaction temperature, and maintaining the reaction temperature for a first time period

S102 lowering the reaction temperature to a fourth temperature and adding a second phosphoric acid solution consisting a second quantity of the phosphoric acid, and processing a reaction of the first phosphoric acid solution, the second phosphoric acid solution and the iron powder for a second time period in order to produce the first product

Figure 2:
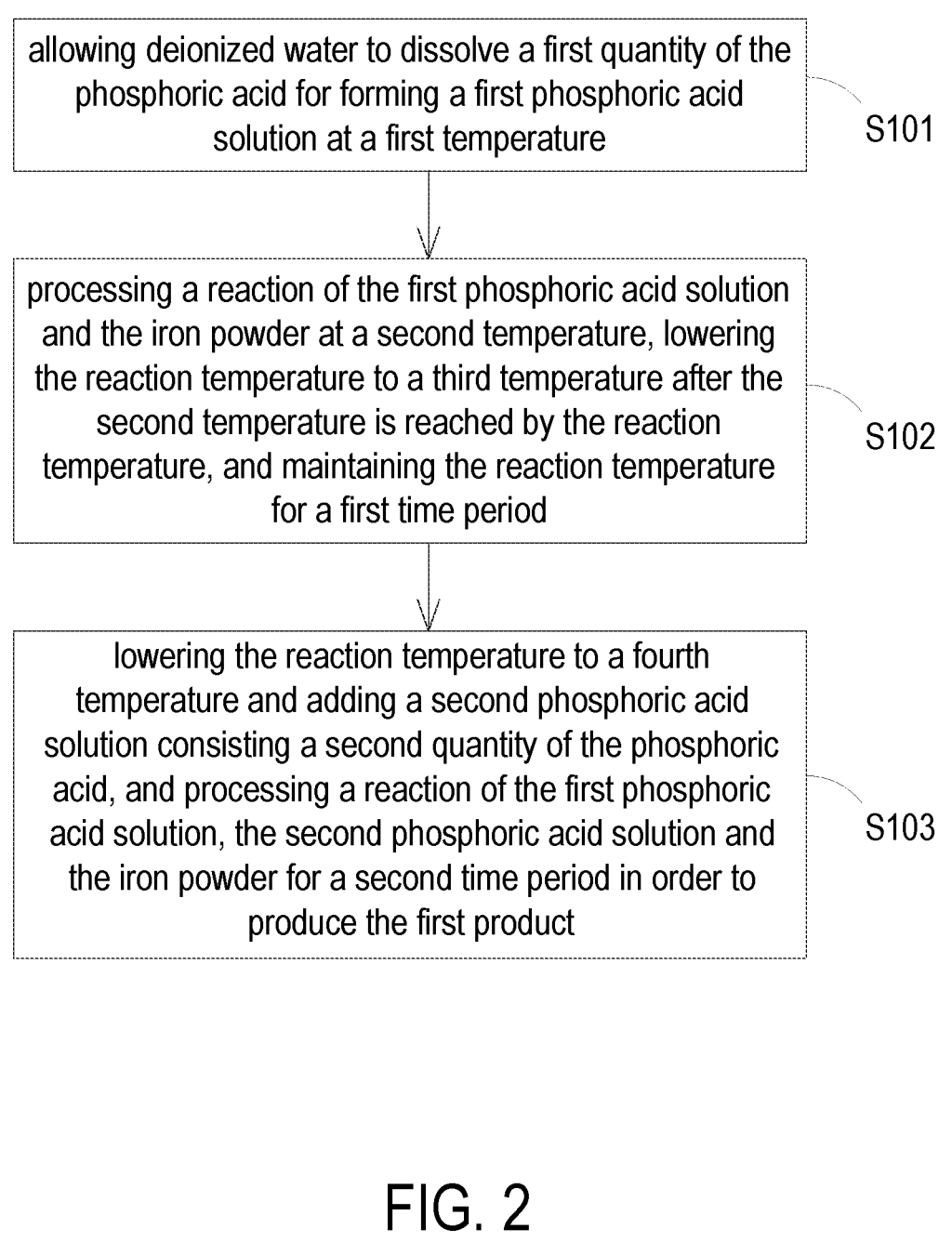

S103

FIG. 2 forming a mixed solution of the first product, the lithium salt mixture and the carbon source

S501 adding a dispersant and performing a spray granulation

S502 performing a high-temperature calcination

S503 forming the lithium iron phosphate cathode material

S504

1

PREPARATION METHOD OF LITHIUM IRON PHOSPHATE CATHODE MATERIAL

CROSS-REFERENCE TO RELATED APPLICATIONS

This application claims priority to Taiwan Patent Application No. 111136550, filed on Sep. 27, 2022. The entire contents of the above-mentioned patent application are incorporated herein by reference for all purposes.

FIELD OF THE INVENTION

The present disclosure relates to a preparation method of a cathode material, and more particularly to a preparation method of a lithium iron phosphate cathode material for a secondary battery.

BACKGROUND OF THE INVENTION

Lithium-ion battery is a secondary battery that can be recharged and discharged repeatedly. With the lithium ions to be moved between the positive electrode and the negative electrode, the charging and discharging work of the secondary battery is completed. Therefore, lithium-ion batteries need to use an intercalated lithium compound as the electrode material. The cathode materials used in traditional lithium-ion batteries are mainly lithium cobalt oxide (LiCoO$_2$), lithium manganate (LiMn$_2$O$_4$), lithium nickelate (LiNiO$_2$) and lithium iron phosphate (LiFePO$_4$). Among them, the lithium iron phosphate battery having the olivine structure as the cathode material is widely used in electric vehicles and energy storage equipment because of its good safety, large specific capacity, long cycle life, high temperature resistance and low cost.

Particularly, the Lithium Ferric Phosphate (LiFePO$_4$, hereinafter referred as "LFP") composite batteries are widely accepted by the market because of the large current and long-life cycle. After years of research, the Lithium Ferric Phosphate Nano-Co-crystalline Olivine (hereinafter referred as "LFP-NCO") battery is developed. The LFP-NCO battery is a single compound consisting Li, Fe, P and metals or precursor of metal composition, and is a non-coated and non-doped material, so that the LFP-NCO battery can significantly improve the power conductivity and eliminate impurities. Moreover, the price of the LFP-NCO battery is lower than conventional lithium ferric phosphate materials, in which the LFP-NCO battery has higher market competitiveness and becomes the main product of the industry.

In general, ferric phosphate (FePO$_4$), lithium hydroxide (LiOH) and lithium carbonate (Li$_2$CO$_3$) are applied to process a reaction of the conventional preparation method of LFP-NCO. Due to the high cost of raw materials of lithium hydroxide, the high requirement of much more ferric phosphate, and much more grinding times, the costs per unit of time and money are increased. Moreover, the preparation method includes acid-base neutralization reactions, so the process is quite sensitive to the pH value, which causes viscosity of materials and the blockage of processing pipes. Also, the processing temperature cannot be stably controlled because of the endothermic and exothermic phenomena of the neutralization reactions, such that the operational difficulty is increased over and over again. In addition, in the process of the aforementioned preparation method, the materials have to be moved for several times, which causes risk of pollutions, thereby decreasing the product quality.

There is a need of providing a preparation method of a lithium iron phosphate cathode material for a secondary battery, so as to improve the product quality, reduce the raw materials, the time cost and the difficulty of manufacturing process operation, and obviate the drawbacks encountered from the prior art.

SUMMARY OF THE INVENTION

It is an object of the present invention to provide a preparation method of a lithium iron phosphate cathode material for a secondary battery. The formation mechanism of the precursor Fe$_3$(PO$_4$)$_2$·8H$_2$O+Li$_3$PO$_4$ is utilized in the preparation of the lithium iron phosphate cathode material to solve the problems of high raw material and time costs in the preparation of the conventional battery. Moreover, the disadvantages of acid-base neutralization reaction that cause the manufacturing process to be sensitive to pH value, the pipeline blockage and the difficult of temperature control, and pollution caused by multiple raw material transfers are avoided.

Another object of the present invention provides a preparation method of a lithium iron phosphate cathode material for a secondary battery. By using the precursor produced by the reaction of amorphous phosphate and lithium salt mixture to prepare the battery composite materials, it has advantages of reducing the grinding time and the costs per unit of time and money. Meanwhile, the sensitivity of pH value of the process is reduced, the viscosity of the material and the blockage of processing pipes are avoided, the processing temperature is stably controlled, and the operational difficulty of the process and the mass production line is reduced.

A further object of present invention provides a preparation method of a lithium iron phosphate cathode material for a secondary battery. Since the first product formed by the reaction of phosphoric acid and iron powder is amorphous iron phosphate, it can ensure the full reaction of phosphoric acid and iron powder, and achieve the effect of effectively reducing the waste of raw materials and comprehensively improving product quality. Furthermore, a lithium salt mixture is added in a certain proportion range to grind and mix with the first product, and it facilitates to make the pH value of the mixed solution stably controlled between 7.5 and 9. In that, the pH sensitivity of the manufacturing process is reduced, the viscosity of the raw material and the blockage of processing pipes are avoided, the processing temperature is stably controlled, and the operational difficulty of the manufacturing process and the mass production line is reduced. Since the lithium source in the lithium iron phosphate cathode material is not completely provided by lithium hydroxide, but partly provided by lithium carbonate, it facilitates to control the pH value and save the raw material costs.

In accordance with an aspect of the present disclosure, there is provided a preparation method of a lithium iron phosphate cathode material. The preparation method includes steps of: (a) providing a phosphoric acid, an iron powder and a carbon source, wherein the phosphoric acid and the iron powder are reacted to produce a first product, and the first product is amorphous iron phosphate with chemical formula of a-FePO$_4$·xH$_2$O (x>0); (b) providing a lithium salt mixture, wherein the lithium salt mixture includes a lithium hydroxide and a lithium carbonate; (c) grinding and mixing the first product, the carbon source, and the lithium salt mixture; (d) calcining the first product and the lithium salt mixture to produce a precursor, wherein the precursor has a formula of $Fe_3(PO_4)_2 \cdot 8H_2O + Li_3PO_4$; and (e) calcining the precursor and the carbon source to obtain the lithium iron phosphate cathode material.

In an embodiment, the lithium content of the lithium hydroxide has a first mole fraction relative to the lithium content of the lithium salt mixture, and the first mole fraction is ranged from 0.5 to 0.7.

In an embodiment, the lithium content of the lithium carbonate has a second mole fraction relative to the lithium content of the lithium salt mixture, and the second mole fraction is ranged from 0.3 to 0.5.

In an embodiment, the first product, the carbon source and the lithium salt mixture in the step (c) have a pH value less than or equal to 9.

In an embodiment, the first product, the carbon source and the lithium salt mixture in the step (c) have a pH value ranged from 7.5 to 9.

In an embodiment, the lithium iron phosphate cathode material is a lithium ferric phosphate nano-co-crystalline olivine (LFP-NCO) with carbon coating.

In an embodiment, the step (a) further includes steps of: (a1) allowing deionized water to dissolve a first quantity of the phosphoric acid for forming a first phosphoric acid solution at a first temperature; (a2) processing a reaction of the first phosphoric acid solution and the iron powder at a second temperature, lowering the reaction temperature to a third temperature after the second temperature is reached by the reaction temperature, and maintaining the reaction temperature for a first time period; and (a3) lowering the reaction temperature to a fourth temperature and adding a second phosphoric acid solution consisting a second quantity of the phosphoric acid, and processing a reaction of the first phosphoric acid solution, the second phosphoric acid solution and the iron powder for a second time period in order to produce the first product.

In an embodiment, the weight ratio of the first quantity to the second quantity is 3:1.

In an embodiment, the first temperature is ranged from 35° C. to 45° C., the second temperature is equal to or less than 60° C., the third temperature is equal to or less than 50° C., and the fourth temperature is equal to or less than 30° C.

In an embodiment, the first time period is at least 3 hours and the second time period is at least 18 hours.

In an embodiment, the step (c) further includes steps of: (c1) performing a grinding action to a mixed solution of the first product and the lithium salt mixture at a first rotational speed; (c2) adding the carbon source after the grinding action is performed for a third time period, and continuing to perform the grinding action; and (c3) performing a spray drying action to the mixed solution when the mixed solution is ground to have a particle diameter less than a first length.

In an embodiment, an entrance temperature of the spray drying action is 210° C., an exit temperature of the spray drying action is 95° C., and a rotational speed of said spray drying action is ranged from 300 Hz to 400 Hz.

In an embodiment, the first rotational speed is ranged from 450 rpm to 650 rpm, the third time period is at least 5 minutes, and the first length is 1 micrometer.

In accordance with another aspect of the present disclosure, there is provided a preparation method of a lithium iron phosphate cathode material. The preparation method includes steps of: (a) providing a phosphoric acid and an iron powder, wherein the phosphoric acid and the iron powder are reacted to produce a first product, and the first product is amorphous iron phosphate with chemical formula of a-$FePO_4 \cdot xH_2O$ (x>0); (b) providing a lithium salt mixture, wherein the lithium salt mixture includes a lithium hydroxide and a lithium carbonate; (c) grinding and mixing the first product, and the lithium salt mixture; (d) calcining the first product and the lithium salt mixture to produce a precursor, wherein the precursor has a formula of $Fe_3(PO_4)_2 \cdot 8H_2O + Li_3PO_4$; and (e) calcining the precursor to obtain the lithium iron phosphate cathode material.

In an embodiment, the step (c) further includes steps of: (c1) performing a grinding action to a mixed solution of the first product and the lithium salt mixture at a first rotational speed; (c2) adding the carbon source after the grinding action is performed for a third time period, and continuing to perform the grinding action; and (c3) performing a spray drying action to the mixed solution when the mixed solution is ground to have a particle diameter less than a first length.

In an embodiment, an entrance temperature of the spray drying action is 210° C., an exit temperature of the spray drying action is 95° C., and a rotational speed of said spray drying action is ranged from 300 Hz to 400 Hz.

In an embodiment, the first rotational speed is ranged from 450 rpm to 650 rpm, the third time period is at least 5 minutes, and the first length is 1 micrometer.

In an embodiment, the mixed solution has a pH value ranged from 7.5 to 9.

In an embodiment, the molar ratio of the lithium content of the lithium carbonate to the lithium content of the lithium hydroxide in the lithium salt mixture is ranged from 3/7 to 1.

The above contents of the present disclosure will become more readily apparent to those ordinarily skilled in the art after reviewing the following detailed description and accompanying drawings, in which:

BRIEF DESCRIPTION OF THE DRAWINGS

FIG. 1 schematically illustrates the flow chart of a preparation method of a lithium iron phosphate cathode material according to an embodiment of the present disclosure;

FIG. 2 schematically illustrates a detailed flow chart of the preparation method of the lithium iron phosphate cathode material according to the embodiment of the present disclosure;

DETAILED DESCRIPTION OF THE PREFERRED EMBODIMENT

Figure 3:
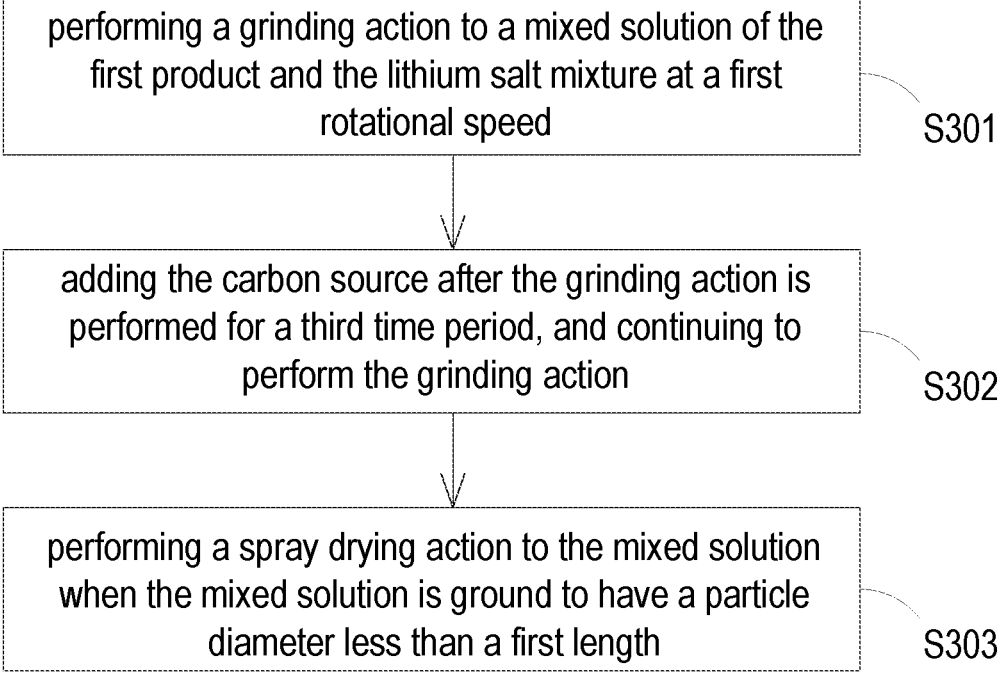
FIG. 3 schematically illustrates another detailed flow chart of the preparation method of the lithium iron phosphate cathode material according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "inner," "outer," "high," "low" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

Please refer to FIG. 1. FIG. 1 schematically illustrates the flow chart of a preparation method of a lithium iron phosphate cathode material according to an embodiment of the present disclosure. A preparation method of a lithium iron phosphate cathode material of the present disclosure includes steps as follows. At first, providing phosphoric acid, iron powder and a carbon source as shown in step S100, among which the carbon source is not limited to a carbohydrate, an organic compound, a polymer or a macromolecule material, the formula of the phosphoric acid is written by $H_3PO_4$, and the formula of the iron powder is written by Fe. In some embodiments, the carbohydrate is not limited to fructose, sucrose, lactose or galactose. The macromolecule material is not limited to polyvinylpyrrolidone, and the formula of the macromolecule material is written by $(C_6H_9NO)_n$, among which n is a natural number, and the IUPAC name of the macromolecule material is PVP. The phosphoric acid and the iron powder are reacted to produce a first product. Preferably but not exclusively, in the embodiment, the first product is amorphous iron phosphate with chemical formula of a-$FePO_4 \cdot xH_2O$, and x>0.

Next, a lithium salt mixture is provided, as shown in step S200. In the embodiment, the lithium salt mixture includes a lithium carbonate and a lithium hydroxide. The formula of the lithium carbonate is written by $Li_2CO_3$, and the formula of the lithium hydroxide is written by LiOH. Notably, the lithium carbonate and the lithium hydroxide in the lithium salt mixture have a certain ratio range. Preferably but not exclusively, the lithium content of the lithium hydroxide has a first mole fraction relative to the lithium content of the lithium salt mixture, and the first mole fraction is ranged from 0.5 to 0.7. Preferably but not exclusively, the lithium content of the lithium carbonate has a second mole fraction relative to the lithium content of the lithium salt mixture, and the second mole fraction is ranged from 0.3 to 0.5. In other words, the lithium source in the lithium iron phosphate cathode material is not completely provided by the lithium hydroxide, and the molar ratio of the lithium content of the lithium carbonate to the lithium content of the lithium hydroxide in the lithium salt mixture is ranged from 3/7 to 1. A part of the lithium hydroxide is replaced with the lithium carbonate. In this way, the pH sensitivity of the manufacturing process is reduced, the viscosity of the material and the blockage of processing pipes are avoided, the processing temperature is stably controlled, and the operational difficulty of the process and the mass production line is reduced. Furthermore, it facilitates to save raw material costs.

Then, as shown in the step S300, the first product and the lithium salt mixture are ground and mixed, and the carbon source is added during the grinding action. Thereafter, as shown in the step S400, the first product and the lithium salt mixture after grinding and mixing are calcined to produce a precursor. Preferably but not exclusively, the precursor has a formula of $Fe_3(PO_4)_2 \cdot 8H_2O + Li_3PO_4$.

Finally, as shown in the step S500, the precursor and the carbon source are calcined to react, and the lithium iron phosphate cathode material $LiFePO_4$ is obtained. In other embodiments, the metal oxide, such as $V_2O_5$ or MgO, can be added into the reaction in the step S300, so that a $LiFePO_4$-like material consisting of the metal oxide is produced, which can be called or named "lithium ferric phosphate nano-co-crystalline olivine (LFP-NCO)". Certainly, the present disclosure is not limited thereto.

From the above, the present invention provides a preparation method of a lithium iron phosphate cathode material. Through the first product formed by the reaction of phosphoric acid and iron powder, it can ensure the full reaction of phosphoric acid and iron powder, and achieve the effect of effectively reducing the waste of raw materials and comprehensively improving product quality. Furthermore, a lithium salt mixture containing lithium hydroxide and lithium carbonate in a certain proportion is added to grind and mix with the first product. It facilitates to reduce the pH sensitivity of the manufacturing process, avoid the viscosity of the raw material and the blockage of processing pipes, and control the processing temperature stably, and reduce the operational difficulty of the manufacturing process and the mass production line. It further facilitates to save the raw material costs.

Please refer to FIG. 1 and FIG. 2. FIG. 2 schematically illustrates a detailed flow chart of the preparation method of the lithium iron phosphate cathode material according to the embodiment of the present disclosure. As shown in FIG. 1 and FIG. 2, the detailed flow chart of the step S100 of the preparation method of the lithium iron phosphate cathode material of the present disclosure includes steps as follows.

As shown in step 101, deionized water is allowed to dissolve a first quantity of the phosphoric acid for forming a first phosphoric acid solution at a first temperature. Preferably but not exclusively, the first temperature can be preheated to a temperature ranged from 35° C. to 45° C., and is preferred to be preheated to 42° C., but not limited thereto. Next, as shown in step S102, a reaction of the first phosphoric acid solution and the iron powder is processed at a second temperature, the reaction temperature is lowered to a third temperature after the second temperature is reached by the reaction temperature, and the reaction temperature is maintained at the third temperature for a first time period. In some embodiments, the first phosphoric acid may be replaced by a compound releasing phosphate ions in a solution so as to be reacted with the iron powder in order to produce the first product, but not limited thereto. The second temperature is equal to or less than 60° C., and is preferably 60° C., and the third temperature is equal to or less than 50° C., and is preferably 50° C. The first time period is at least 3 hours, and is preferably 3 hours.

In other words, the preferably embodiment of the step S102 is not limited to be implemented as processing a reaction of the first phosphoric acid solution and the iron powder at 60° C., lowering the reaction temperature to 50° C. after the reaction temperature reached 60° C., and maintaining the reaction temperature at 50° C. for 3 hours. Then, as shown in step S103, the reaction temperature is lowered to a fourth temperature and a second phosphoric acid solution consisting a second quantity of the phosphoric acid is added, so that the reaction of the first phosphoric acid solution, the second phosphoric acid solution and the iron powder is processed for a second time period to produce the first product.

In this embodiment, the first product is an amorphous body of ferric phosphate, and the formula of the first product is written by a-FePO$_4$·xH$_2$O (a>0, x>0). The fourth temperature is equal to or less than 30° C., and is preferably 30° C. The second time period is at least 18 hours, and is preferably 18 hours. The weight ratio of the first quantity to the second quantity is 3:1, i.e. the first quantity is 75% and the second quantity is 25%. Through the fully reacted phosphoric acid and iron powder of the two-times reactions of the phosphoric acid, the deionized water and the iron powder, the waste of materials is reduced, and the product qualities are totally enhanced.

After 18 hours of the above-mentioned reaction, the step S300 of the preparation method of the lithium iron phosphate cathode material of the present disclosure is performed. Please refer to FIG. 3. FIG. 3 schematically illustrates another detailed flow chart of the preparation method of the lithium iron phosphate cathode material according to an embodiment of the present disclosure. At first, as shown in step S301 illustrated in FIG. 3, the first product is ground at a first rotational speed. Preferably but not exclusively, the first rotational speed is ranged from 450 rpm to 650 rpm, and is preferably 550 rpm.

Next, as shown in step S302, the carbon source and the lithium salt mixture in a certain ratio range are added after the grinding action is performed for a third time period. Preferably but not exclusively, after the grinding action is performed for the third time period of at least 5 minutes, the carbon source and the lithium salt mixture are added and the grinding action is performed continuously till the step S303, so as to produce a mixed solution. Preferably but not exclusively, the carbon source is the macromolecule material PVP. The step S303 is shown as performing a spray drying action and a thermal treatment to the mixed solution in order to obtain the precursor when the mixed solution is ground to have a particle diameter (i.e. particle size distribution D$_{50}$) less than a first length, so as to obtained a dried precursor. Preferably but not exclusively, the first length is 1 micrometer. The precursor has a formula of Fe$_3$(PO$_4$)$_2$·8H$_2$O+Li$_3$PO$_4$.

In the embodiment, the spray drying action is implemented by a rotary spray dryer. An entrance temperature of the spray drying action or the rotary spray dryer is 210° C., an exit temperature of the spray drying action or the rotary spray dryer is 95° C., and the rotational speed of the spray drying action or the rotary spray dryer is ranged from 300 Hz to 400 Hz, but not limited thereto.

Figure 4:
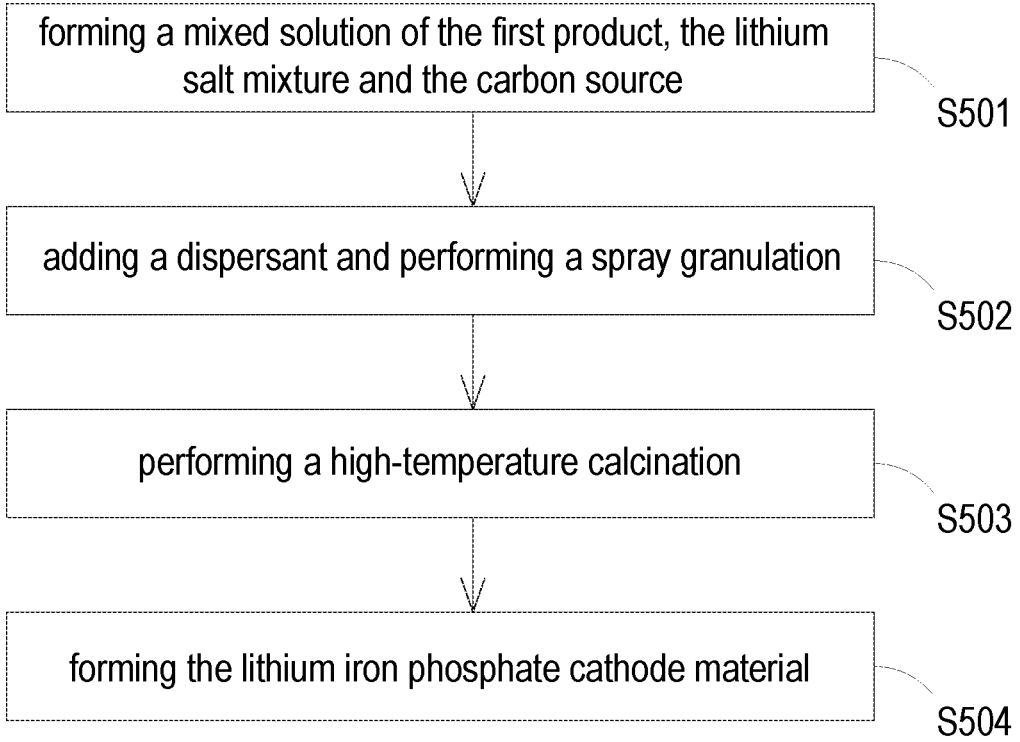
FIG. 4 schematically illustrates still another detailed flow chart of the preparation method of the lithium iron phosphate cathode material according to an embodiment of the present disclosure.

The precursor of the preparation method of the lithium iron phosphate cathode material of the present disclosure is completely prepared. The detailed flow char of the step S500 is described as follows. Please refer to FIG. 4. FIG. 4 schematically illustrates still another detailed flow chart of the preparation method of the lithium iron phosphate cathode material according to an embodiment of the present disclosure. As shown in FIG. 4, the detailed flow chart of the step S500 includes the step S501, and the first product, the lithium salt mixture and the carbon source are ground and mixed to form a mixed solution. Then, as shown in the step S502, a dispersant is added and a spray granulation is performed. As shown in the step 503, a high-temperature calcination is performed. Finally, as shown in the step S504, the lithium iron phosphate cathode material (i.e. LiFePO$_4$) produced by the preparation method of the present disclosure is obtained.

The following embodiment is presented herein for purpose of illustration and description of the preparation method of the battery composite material of the present disclosure.

Example 1

Figure 5:
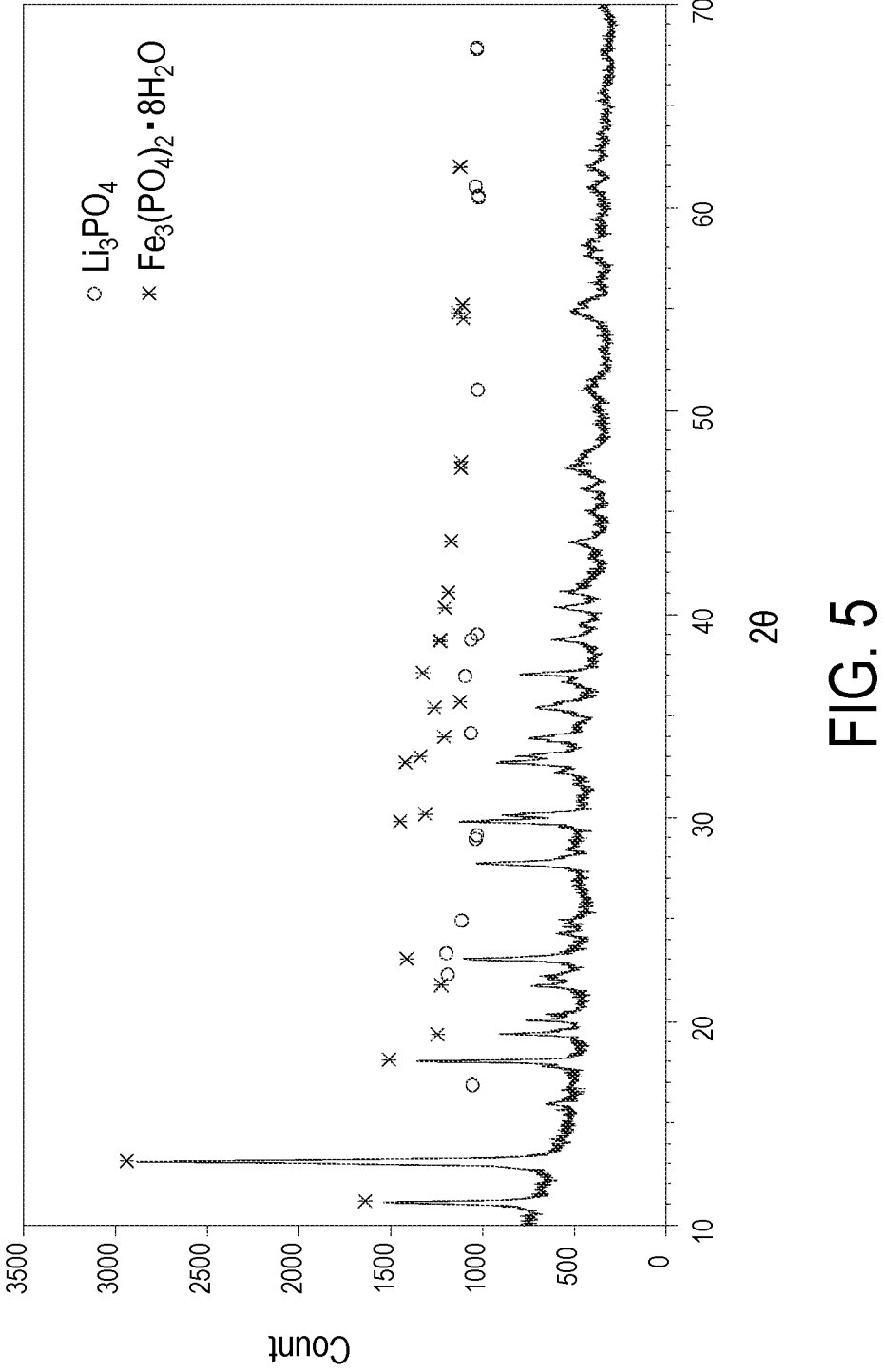
FIG. 5 schematically illustrates the XRD analysis diagram of a precursor prepared by the preparation method of the lithium iron phosphate cathode material of the present disclosure.

At first, 518.6 grams of phosphoric acid (Purity>85%), deionized water and 253 grams of iron powder (Purity>99%) are provided, and one-time reaction is processed to produce the first product. Next, the lithium salt mixture is added. Preferably, the lithium salt mixture includes 95.33 grams of lithium hydroxide (concentration 50 wt. %) and 83.78 grams of lithium carbonate. That is, the molar ratio of the lithium content of lithium carbonate to the lithium content of lithium hydroxide in the lithium salt mixture is 1:1, each providing 50% of the lithium source. In this way, the pH value can be controlled at 7.9 after stirring for 20 hours. Next, a dispersant is added in the mixture and a horizontal sander is utilized to grind the mixture (at rotational speed ranged from 450 rpm to 650 rpm) for 1 hour, among which a carbon source can be added in the grinding action. Preferably, a carbon source (e.g. a carbohydrate, an organic compound, a polymer or a macromolecule material such as PVP) can be added during the grounding action, to obtain a mixed solution including the precursor Fe$_3$(PO$_4$)$_2$·8H$_2$O+Li$_3$PO$_4$. Then, a spray drying action is performed to the mixed solution, the dried product is put into a ceramic sagger, and a calcination is performed to the dried product, so as to obtain the precursor. The calcined precursor is analyzed in manner of X-ray diffraction, and the analysis diagram is shown as FIG. 5. After comparing the diagram with JCPDS card, the precursor is confirmed to be Fe$_3$(PO$_4$)$_2$·8H$_2$O+Li$_3$PO$_4$.

Figure 6:
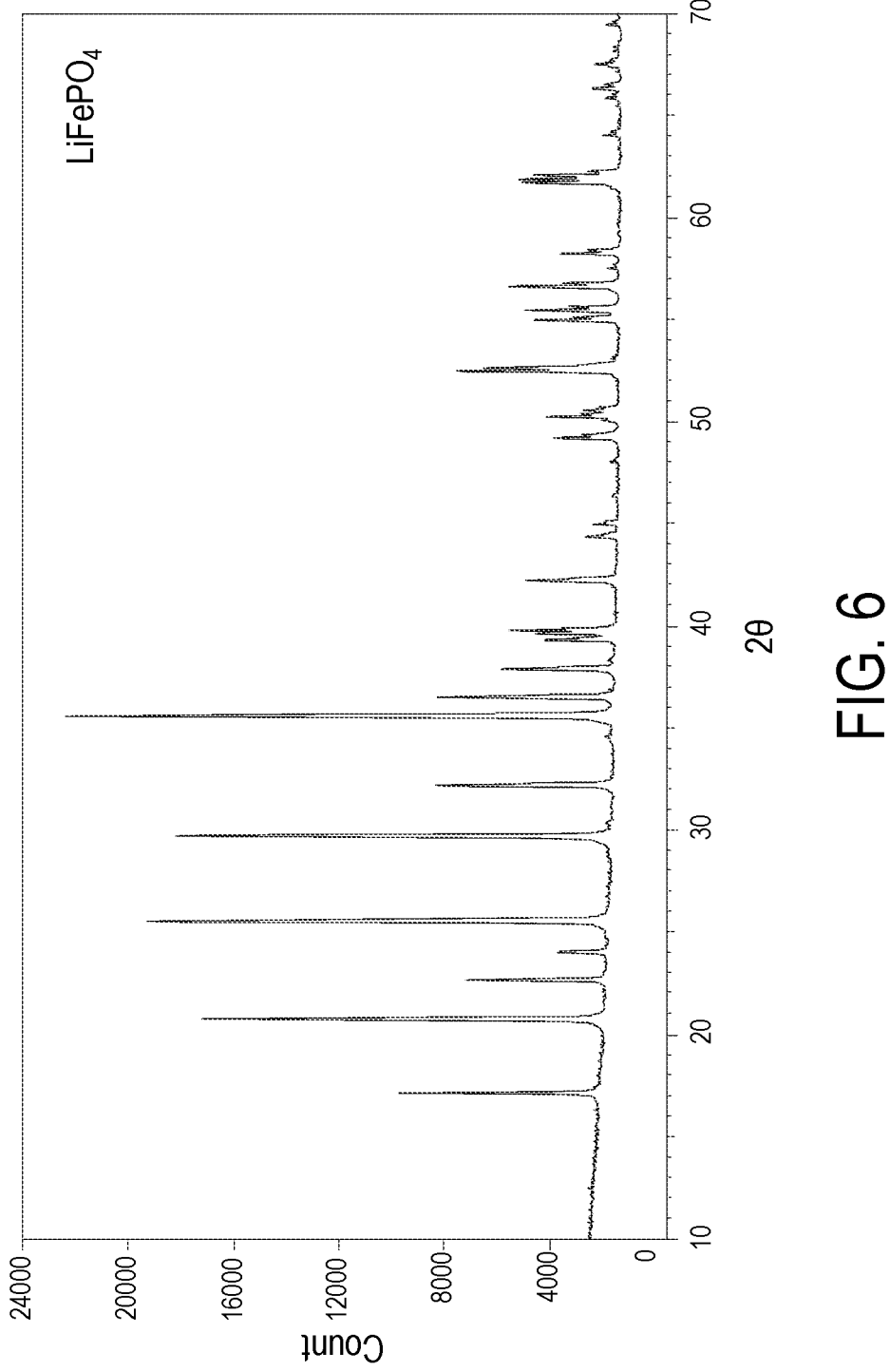
FIG. 6 schematically illustrates the XRD analysis diagram of the lithium iron phosphate cathode material prepared by the preparation method of the lithium iron phosphate cathode material of the present disclosure.

Next, the precursor after spray drying is calcined at 550° C. for 4 hours and 700° C. for 4 hours in an inert gas, so as to obtain the lithium iron phosphate cathode material of the present disclosure. The calcined compound is analyzed in manner of X-ray diffraction, and the analysis diagram is shown as FIG. 6. After comparing the diagram with JCPDS card, the compound is confirmed to be LiFePO$_4$. The obtained lithium iron phosphate cathode material has an average particle diameter of 14.00 μm and a specific surface area of 19.88 m$^2$/g, and its electrical analysis results are shown in Table 1.

TABLE 1

| | 0.1 C Charge/0.1 C Discharge | | | | 2 C Charge/2 C Discharge | | | |
|---|---|---|---|---|---|---|---|---|
| | 1st Charge | 1st Discharge | 2nd Charge | 2nd Discharge | 3rd Charge | 3rd Discharge | 4th Charge | 4th Discharge |
| Example 1 | 164 | 156 | 158 | 158 | 159 | 136 | 137 | 136 |

Unit: mAh/g

Example 2

Similarly, 518.6 grams of phosphoric acid (Purity>85%), deionized water and 253 grams of iron powder (Purity>99%) are provided, and one-time reaction is processed to produce the first product. The lithium salt mixture input in Example 2 is different from that in Example 1. The lithium salt mixture for Example 2 includes 114.4 grams of lithium hydroxide (concentration 50 wt. %) and 67.02 grams of lithium carbonate. That is, the molar ratio of the lithium content of lithium carbonate to the lithium content of lithium hydroxide in the lithium salt mixture is 2:3, and the lithium carbonate and the lithium hydroxide provide 40% and 60% of the lithium source, respectively. In this way, the pH value can be controlled at 8.2 after stirring for 20 hours. Next, a dispersant is added in the mixture and a horizontal sander is utilized to grind the mixture (at rotational speed ranged from 450 rpm to 650 rpm) for 1 hour, and a carbon source is added in the grinding action, so as to obtain a mixed solution including the precursor $Fe_3(PO_4)_2 \cdot 8H_2O + Li_3PO_4$. Then, the precursor after spray drying is calcined at 550° C. for 4 hours and 700° C. for 4 hours in an inert gas, so as to obtain the lithium iron phosphate cathode material ($LiFePO_4$) of the present disclosure. The obtained lithium iron phosphate cathode material has an average particle diameter of 17.96 μm and a specific surface area of 20.63 $m^2$/g, and its electrical analysis results are shown in Table 2.

TABLE 2

| | 0.1 C Charge/0.1 C Discharge | | | | 2 C Charge/2 C Discharge | | | |
|---|---|---|---|---|---|---|---|---|
| | 1st Charge | 1st Discharge | 2nd Charge | 2nd Discharge | 3rd Charge | 3rd Discharge | 4th Charge | 4th Discharge |
| Example 2 | 165 | 156 | 159 | 157 | 140 | 130 | 129 | 130 |

Unit: mAh/g

Example 3

Similarly, 518.6 grams of phosphoric acid (Purity>85%), deionized water and 253 grams of iron powder (Purity>99%) are provided, and one-time reaction is processed to produce the first product. The lithium salt mixture input in Example 3 is different from that in Example 1. The lithium salt mixture for Example 3 includes 133.47 grams of lithium hydroxide (concentration 50 wt. %) and 50.27 grams of lithium carbonate. That is, the molar ratio of the lithium content of lithium carbonate to the lithium content of lithium hydroxide in the lithium salt mixture is 3:7, and the lithium carbonate and the lithium hydroxide provide 30% and 70% of the lithium source, respectively. In this way, the pH value can be controlled at 8.4 after stirring for 20 hours. Next, a dispersant is added in the mixture and a horizontal sander is utilized to grind the mixture (at rotational speed ranged from 450 rpm to 650 rpm) for 1 hour, and a carbon source is added in the grinding action, so as to obtain a mixed solution including the precursor $Fe_3(PO_4)_2 \cdot 8H_2O + Li_3PO_4$. Then, the precursor after spray drying is calcined at 550° C. for 4 hours and 700° C. for 4 hours in an inert gas, so as to obtain the lithium iron phosphate cathode material ($LiFePO_4$) of the present disclosure. The obtained lithium iron phosphate cathode material has an average particle diameter of 13.00 μm and a specific surface area of 18.87 $m^2$/g, and its electrical analysis results are shown in Table 3.

TABLE 3

| | 0.1 C Charge/0.1 C Discharge | | | | 2 C Charge/2 C Discharge | | | |
|---|---|---|---|---|---|---|---|---|
| | 1st Charge | 1st Discharge | 2nd Charge | 2nd Discharge | 3rd Charge | 3rd Discharge | 4th Charge | 4th Discharge |
| Example 3 | 162 | 155 | 156 | 157 | 158 | 132 | 133 | 131 |

Unit: mAh/g

From the electrical analysis results of the lithium iron phosphate cathode material obtained in Example 1 to Example 3, it can be seen that the lithium iron phosphate cathode material is prepared by the formation mechanism of the precursor $Fe_3(PO_4)_2 \cdot 8H_2O + Li_3PO_4$ in the present disclosure, and has the specific surface area ranged from 18 $m^2/g$ to 21 $m^2/g$, and the 0.1C charge and discharge capacity greater than 150 mAh/g. Namely, the lithium iron phosphate cathode materials prepared the formation mechanism of the present disclosure have excellent physical and electrical properties. Certainly, the preparation method of the lithium iron phosphate cathode material in the present disclosure can produce the lithium iron phosphate cathode material meeting the required product specifications through the adjustment of the aforementioned many process parameters. Certainly, the present disclosure is not limited thereto.

In summary, the present disclosure provides a preparation method of a lithium iron phosphate cathode material for a secondary battery. The formation mechanism of the precursor $Fe_3(PO_4)_2 \cdot 8H_2O + Li_3PO_4$ is utilized in the preparation of the lithium iron phosphate cathode material to solve the problems of high raw material and time costs in the preparation of the conventional battery. Moreover, the disadvantages of acid-base neutralization reaction that cause the manufacturing process to be sensitive to pH value, the pipeline blockage and the difficult of temperature control, and pollution caused by multiple raw material transfers are avoided. By using the precursor produced by the reaction of amorphous phosphate and lithium salt mixture to prepare the battery composite materials, it has advantages of reducing the grinding time and the costs per unit of time and money. Meanwhile, the sensitivity of pH value of the process is reduced, the viscosity of the material and the blockage of processing pipes are avoided, the processing temperature is stably controlled, and the operational difficulty of the process and the mass production line is reduced. Since the first product formed by the reaction of phosphoric acid and iron powder is amorphous iron phosphate, it can ensure the full reaction of phosphoric acid and iron powder, and achieve the effect of effectively reducing the waste of raw materials and comprehensively improving product quality. Furthermore, a lithium salt mixture is added in a certain proportion range to grind and mix with the first product, and it facilitates to make the pH value of the mixed solution stably controlled between 7.5 and 9. In that, the pH sensitivity of the manufacturing process is reduced, the viscosity of the raw material and the blockage of processing pipes are avoided, the processing temperature is stably controlled, and the operational difficulty of the manufacturing process and the mass production line is reduced. Since the lithium source in the lithium iron phosphate cathode material is not completely provided by lithium hydroxide, but partly provided by lithium carbonate, it facilitates to control the pH value and save the raw material costs.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A preparation method of a lithium iron phosphate cathode material, comprising steps of:

(a) providing a phosphoric acid, an iron powder and a carbon source, wherein the phosphoric acid and the iron powder are reacted to produce a first product, and the first product is amorphous iron phosphate with chemical formula of a-$FePO_4 \cdot xH_2O$ (x>0);

(b) providing a lithium salt mixture, wherein the lithium salt mixture comprises a lithium hydroxide and a lithium carbonate;

(c) grinding and mixing the first product, the carbon source, and the lithium salt mixture;

(d) calcining the first product and the lithium salt mixture to produce a precursor, wherein the precursor has a formula of $Fe_3(PO_4)_2 \cdot 8H_2O + Li_3PO_4$; and (e) calcining the precursor and the carbon source to obtain the lithium iron phosphate cathode material.

2. The preparation method of the lithium iron phosphate cathode material according to claim 1, wherein the lithium content of the lithium hydroxide has a first mole fraction relative to the lithium content of the lithium salt mixture, and the first mole fraction is ranged from 0.5 to 0.7.

3. The preparation method of the lithium iron phosphate cathode material according to claim 1, wherein the lithium content of the lithium carbonate has a second mole fraction relative to the lithium content of the lithium salt mixture, and the second mole fraction is ranged from 0.3 to 0.5.

4. The preparation method of the lithium iron phosphate cathode material according to claim 1, wherein the first product, the carbon source and the lithium salt mixture in the step (c) have a pH value less than or equal to 9.

5. The preparation method of the lithium iron phosphate cathode material according to claim 1, wherein the first product, the carbon source and the lithium salt mixture in the step (c) have a pH value ranged from 7.5 to 9.

6. The preparation method of the lithium iron phosphate cathode material according to claim 1, wherein the lithium iron phosphate cathode material is a lithium ferric phosphate nano-co-crystalline olivine (LFP-NCO) with carbon coating.

7. The preparation method of the lithium iron phosphate cathode material according to claim 1, wherein the step (a) further comprises steps of:

(a1) allowing deionized water to dissolve a first quantity of the phosphoric acid for forming a first phosphoric acid solution at a first temperature;

(a2) processing a reaction of the first phosphoric acid solution and the iron powder at a second temperature, lowering the reaction temperature to a third temperature after the second temperature is reached by the reaction temperature, and maintaining the reaction temperature for a first time period; and (a3) lowering the reaction temperature to a fourth temperature and adding a second phosphoric acid solution consisting a second quantity of the phosphoric acid, and processing a reaction of the first phosphoric acid solution, the second phosphoric acid solution and the iron powder for a second time period in order to produce the first product.

8. The preparation method of the lithium iron phosphate cathode material according to claim 7, wherein the weight ratio of the first quantity to the second quantity is 3:1.

9. The preparation method of the lithium iron phosphate cathode material according to claim 7, wherein the first temperature is ranged from 35° C. to 45° C., the second temperature is equal to or less than 60° C., the third temperature is equal to or less than 50° C., and the fourth temperature is equal to or less than 30° C.

10. The preparation method of the lithium iron phosphate cathode material according to claim 7, wherein the first time period is at least 3 hours and the second time period is at least 18 hours.

11. The preparation method of the lithium iron phosphate cathode material according to claim 1, wherein the step (c) further comprises steps of:

(c1) performing a grinding action to a mixed solution of the first product and the lithium salt mixture at a first rotational speed;

(c2) adding the carbon source after the grinding action is performed for a third time period, and continuing to perform the grinding action; and (c3) performing a spray drying action to the mixed solution when the mixed solution is ground to have a particle diameter less than a first length.

12. The preparation method of the lithium iron phosphate cathode material according to claim 11, wherein an entrance temperature of the spray drying action is 210° C., an exit temperature of the spray drying action is 95° C., and a rotational speed of said spray drying action is ranged from 300 Hz to 400 Hz.

13. The preparation method of the lithium iron phosphate cathode material according to claim 11, wherein the first rotational speed is ranged from 450 rpm to 650 rpm, the third time period is at least 5 minutes, and the first length is 1 micrometer.

14. A preparation method of a lithium iron phosphate cathode material, comprising steps of:

(a) providing a phosphoric acid and an iron powder, wherein the phosphoric acid and the iron powder are reacted to produce a first product, and the first product is amorphous iron phosphate with chemical formula of a-$FePO_4 \cdot xH_2O$ (x>0);

(b) providing a lithium salt mixture, wherein the lithium salt mixture comprises a lithium hydroxide and a lithium carbonate;

(c) grinding and mixing the first product and the lithium salt mixture;

(d) calcining the first product and the lithium salt mixture to produce a precursor, wherein the precursor has a formula of $Fe_3(PO_4)_2 \cdot 8H_2O + Li_3PO_4$; and (e) calcining the precursor to obtain the lithium iron phosphate cathode material.

15. The preparation method of the lithium iron phosphate cathode material according to claim 14, wherein the step (c) further comprises steps of:

(c1) performing a grinding action to a mixed solution of the first product and the lithium salt mixture at a first rotational speed;

(c2) adding the carbon source after the grinding action is performed for a third time period, and continuing to perform the grinding action; and (c3) performing a spray drying action to the mixed solution when the mixed solution is ground to have a particle diameter less than a first length.

16. The preparation method of the lithium iron phosphate cathode material according to claim 15, wherein an entrance temperature of the spray drying action is 210° C., an exit temperature of the spray drying action is 95° C., and a rotational speed of said spray drying action is ranged from 300 Hz to 400 Hz.

17. The preparation method of the lithium iron phosphate cathode material according to claim 15, wherein the first rotational speed is ranged from 450 rpm to 650 rpm, the third time period is at least 5 minutes, and the first length is 1 micrometer.

18. The preparation method of the lithium iron phosphate cathode material according to claim 15, wherein the mixed solution has a pH value ranged from 7.5 to 9.

19. The preparation method of the lithium iron phosphate cathode material according to claim 14, wherein the molar ratio of the lithium content of the lithium carbonate to the lithium content of the lithium hydroxide in the lithium salt mixture is ranged from 3/7 to 1.

* * * * *